Jan. 2, 1945. R. K. LEE 2,366,413
CONTROL DEVICE FOR AUTOMOTIVE VEHICLES
Filed Nov. 26, 1942
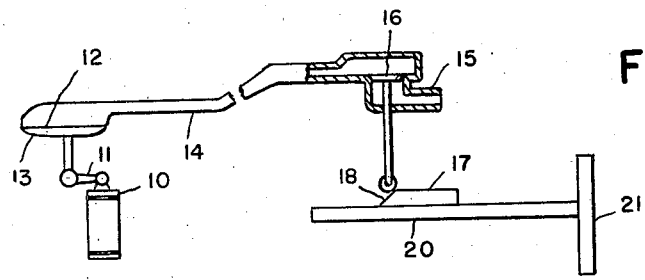
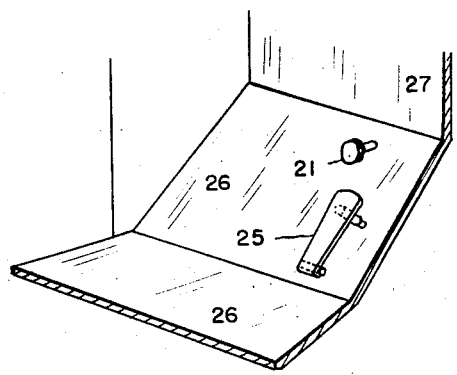
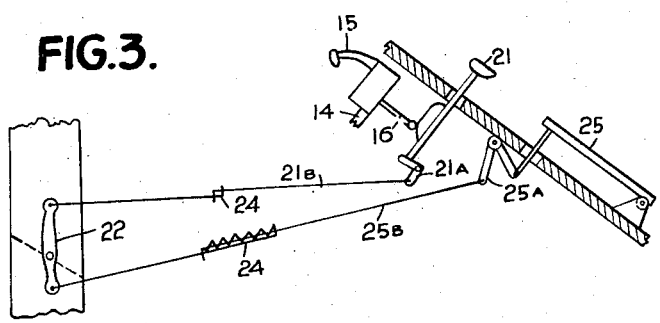
INVENTOR.
ROGER K. LEE
BY
ATTORNEYS Patented Jan. 2, 1945

2,366,413

UNITED STATES PATENT OFFICE 2,366,413

CONTROL DEVICE FOR AUTOMOTIVE VEHICLES

Roger K. Lee, Detroit, Mich.

Application November 26, 1942, Serial No. 467,029

3 Claims. (Cl. 74—472)

The present invention relates to control devices for automotive vehicles and specifically to devices for controlling the reverse movement of the vehicle.

Among the objects of the invention is a control device which is automatic in its action to cause operation of the reversing mechanism and at the same time control engine speed.

Another object is to separate the reverse control means from the means controlling the forward movement of the vehicle and thereby prevent the accidental operation of the reverse while the vehicle is in forward movement.

Another object is a simple cheap and effective means for accomplishing the above indicated results.

Other objects and advantages will be apparent to those skilled in the art upon reference to the following description and the accompanying drawing in which Fig. 1 is a diagrammatic view, with parts in section, showing the operating elements of the device, and Fig. 2 is a perspective view indicating a suitable location of the device within the driver's compartment of a car.

Fig. 3 is a more or less diagrammatic showing of the carburetor linkage.

Referring now to the drawing, the device embodying the present invention is indicated more or less diagrammatically and is shown to consist of reversing mechanism 10, illustrated as the band brake of a planetary gearing. It is of course obvious that other types of reversing gearing may be used if desired.

This brake 10 is through the bell crank 11 attached to the diaphragm 12 of a vacuum motor 13. Secured to the motor above the diaphragm 12 is a conduit 14 extending to the intake manifold 15 of an internal combustion engine, not shown. The conduit 14 will have intermediate its ends a suitable valve 16, by means of which the motive fluid may be supplied to the motor 12 through the action of the intake of the vacuum in the said manifold.

Means for operating the valve 16 is shown as a cam 17 having an abrupt cam surface 18 and having its upper edge parallel with the shank 20 of a suitable pedal 21. The pedal 21, will through connections such as shown in Fig. 3, be connected to the carburetor of the engine of the vehicle, and preferably through the linkage which will limit the speed and produce a much lower rate of acceleration than that produced by the forward control pedal and linkage. The pedal is a separate one from the usual throttle control pedal used for forward operation of the vehicle.

In Fig. 3 the pedal 21 is shown as actuating a small bell crank 21A which through linkage 21B is connected to the longer arm of the throttle actuating lever 22, while the pedal 25 is connected through bellcrank 25A and linkage 25B to the shorter arm of lever 22, suitable slip joints 24 being provided so that the pedals 21 and 25 may be used independently.

As indicated in Figure 2, the driver's compartment of the vehicle will be provided with the conventional foot throttle 25, while the auxiliary pedal 21 may be placed in proximity thereto but spaced sufficiently to prevent accidental operation. In this latter figure, the usual floor boards are shown at 26 with the upright partition 27 dividing the compartment from the engine compartment.

It is of course to be understood that instead of the vacuum motor, as illustrated, any other suitable form of motor may be used provided the motivating medium is supplied to the motor during initial movement of the throttle control pedal and maintained during further movement.

I claim:

1. In an automotive vehicle having an engine, a throttle, and also having a transmission including reversing means, a foot pedal for actuating said throttle to control forward operation, and a separate foot pedal for actuation of said throttle during reverse movement of the vehicle, the second pedal having a different linkage whereby to limit the engine speed and to provide a lower rate of acceleration than that of the first pedal.

2. In an automotive vehicle having an engine, a throttle, and also having a transmission including reversing means, separate operator actuable means for controlling engine speed for the forward movement and for the reverse movement of said vehicle, a foot pedal for actuating said throttle to control forward operation, and a separate foot pedal for actuation of said throttle during reverse movement of the vehicle, the second pedal having a different linkage whereby to limit the engine speed and to provide a lower rate of acceleration than that of the first pedal.

3. In an automotive vehicle having an engine, a throttle, and also having a transmission including reversing means, separate operator actuable means for controlling engine speed for the forward movement and for the reverse movement of said vehicle, a foot pedal for actuating said throttle to control forward operation, and a separate foot pedal for actuation of said throttle during reverse movement of the vehicle, the second pedal having a different linkage whereby to limit the engine speed and to provide a lower rate of acceleration than that of the first pedal, the speed of reverse movement being limited to less than that of the forward movement.

ROGER K. LEE.